United States Patent [19]

Scruggs

[11] Patent Number: 4,725,512

[45] Date of Patent: Feb. 16, 1988

[54] MATERIALS TRANSFORMABLE FROM THE NONAMORPHOUS TO THE AMORPHOUS STATE UNDER FRICTIONAL LOADINGS

[75] Inventor: David M. Scruggs, San Juan Capistrano, Calif.

[73] Assignee: Dresser Industries, Inc., Dallas, Tex.

[21] Appl. No.: 618,885

[22] Filed: Jun. 8, 1984

[51] Int. Cl.[4] .................. B05D 3/06; B32B 15/00; C25D 5/10

[52] U.S. Cl. .................. 428/678; 148/403; 427/53.1; 428/679; 428/681

[58] Field of Search .............. 427/53.1; 428/668, 682, 428/683, 684, 685, 678, 679, 681; 148/403

[56] References Cited

U.S. PATENT DOCUMENTS

| | | | |
|---|---|---|---|
| 3,322,546 | 5/1967 | Tanzman et al. | 106/1 |
| 3,986,867 | 10/1976 | Matsumoto et al. | 148/403 X |
| 4,067,732 | 1/1978 | Ray | 148/403 X |
| 4,124,472 | 11/1978 | Riegert | 204/192 EC |
| 4,124,737 | 11/1978 | Wolfla et al. | 428/640 |
| 4,163,071 | 7/1979 | Weatherly | 427/34 |
| 4,260,416 | 4/1981 | Kavesh | 75/125 |
| 4,381,943 | 5/1983 | Dickson et al. | 75/2.51 |
| 4,409,296 | 10/1983 | Ward | 428/670 X |
| 4,482,612 | 11/1984 | Kuroki et al. | 428/684 X |
| 4,487,630 | 12/1984 | Crook | 75/123 B |
| 4,488,882 | 12/1984 | Dausinger et al. | 427/53.1 X |
| 4,499,158 | 2/1985 | Onuma et al. | 428/684 X |
| 4,515,870 | 5/1985 | Bose et al. | 428/679 X |
| 4,564,396 | 1/1986 | Johnson et al. | 148/403 X |

FOREIGN PATENT DOCUMENTS

| | | |
|---|---|---|
| 7828120 | 5/1979 | France . |
| 56-112449 | 9/1981 | Japan . |
| 2005302 | 4/1979 | United Kingdom . |
| 2106145 | 4/1983 | United Kingdom . |

OTHER PUBLICATIONS

ONR Report (Contract No. 0014-82-K-0555), Development of Wear and Corrosion Resistant Surfaces by Laser Surface Modification Techniques, by Prof. J. Mazumder and C. Cusano, et al., Univ. of Illinois at Urbana-Champaign/Dept. of Mechanical and Industrial Engineering-1206 W. Green St. Urbana, Ill. (Jan. 84), (Prepared for Office of Naval Research) (p. 1-33).

ASTM, Designation: G 65-81 entitled Standard Practice for Conducting Dry Sand/Rubber Wheel Abrasion Tests (pp. 351-368).

Preparation of "Amorphous" $Ni_{60}Nb_{40}$ by Mechanical Alloying, by C. C. Koch et al, in Appl. Phys. Lett., Dec. 1, 1983, pp. 1017-1019.

Primary Examiner—Michael R. Lusignan
Attorney, Agent, or Firm—Gregory O. Garmong; William R. Peoples

[57] ABSTRACT

A process for protecting an article from wear, wherein a frictionally transformable material is provided at the surface of the article, and then the surface of the article is subjected to frictional wear. The wear transforms the outermost layer of the material to the amorphous state, which is more wear resistant and corrosion resistant than is the material in its nonamorphous state. As the material is worn away gradually, the frictional transformation continues, thereby replenishing the amorphous outermost layer, so that a protective outermost layer remains. A particularly satisfactory frictionally transformable material consists essentially of from about 40 to about 75 weight percent of a first component selected from the group consisting of iron, cobalt, and combinations thereof; more than about 20 weight percent of a second component selected from the group consisting of chromium, molybdenum, tungsten, niobium, vanadium, and combinations of chromium, molybdenum, tungsten, niobium, vanadium, and titanium; and from about 2 to about 6 weight percent of a third component selected from the group consisting of boron, carbon, and combinations thereof.

13 Claims, 8 Drawing Figures

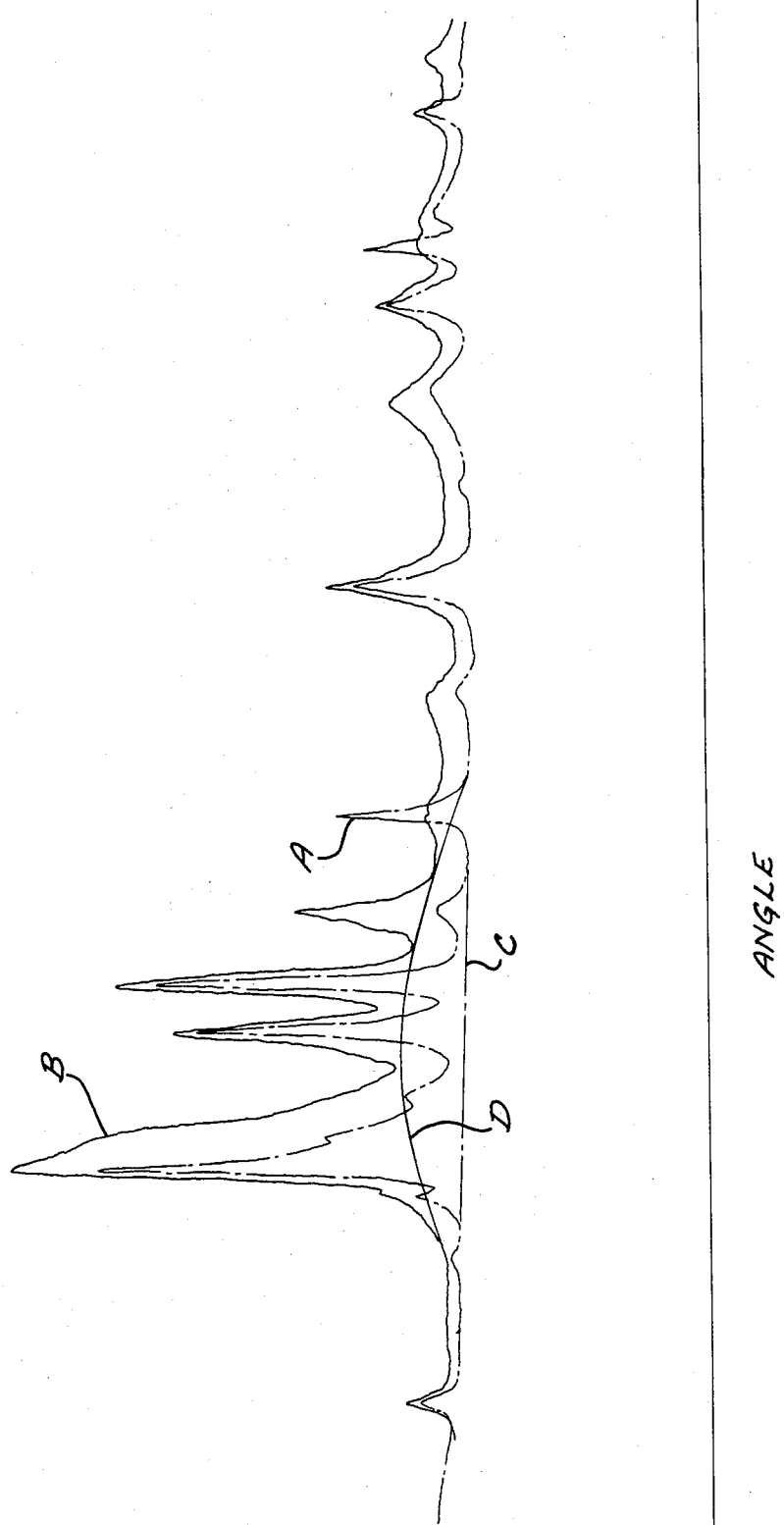

.0001 in.

.0001 in.

.0002 in.

MATERIALS TRANSFORMABLE FROM THE NONAMORPHOUS TO THE AMORPHOUS STATE UNDER FRICTIONAL LOADINGS

BACKGROUND OF THE INVENTION

The present invention relates to amorphous metallic materials, and, more particularly, to the use of materials that transform from a crystalline to an amorphous state under a wearing action.

Wear occurs by the gradual removal of material at a surface exposed to a wearing environment. Reduction of the effects of the wear of materials is a problem of great significance, as each year the direct and indirect costs resulting from wear amount to billions of dollars. Many techniques have therefore been devised to reduce the wear of articles to acceptable levels, including the development of the materials having greater inherent wear resistance, the selection of designs intended to minimize wear, the use of lubricants to reduce surface contact, and the placing of wear-reistant coatings on parts to resist the damage done by wear.

In one approach to wear-resistant coatings, very hard materials are placed on the surfaces of the parts being protected. The hard coatings have higher wear resistance than do the substrates upon which they are coated, thereby acting to reduce the total wear experienced. As an example, a thin layer of a hard, wear-resistant material such as a tungsten carbide-cobalt composite may be bonded onto the exposed surfaces of an article before the article is placed into a wear-including environment. In another example, other kinds of hard particles, such as chromium carbide, may be dispersed throughout a coating matrix, which itself can be hardened. The dispersed hard particles resist frictional wear, but such coating systems suffer from the loss of particles due to wearing of the matrix and undermining of the particles.

In one promising approach to surface protection, it has been found that some metallic materials are extremely wear resistant, moderately ductile, tough and resistant to corrosion when in an amorphous state. Certain materials can exist in both the amorphous and nonamorphous (or crystalline) states, and exhibit the improved wear-resistant properties when in the amorphous state. Most solid metals normally exist in the crystalline state, and special processing is required to place them into the amorphous state. The amorphous state may be produced by any of several techniques, such as rapid quenching from the liquid state, ion implantation, or electrodeposition in some instances. Amorphous materials have regions of no short range or long range order, and also have no grain boundaries.

To enjoy the benefits of the high wear resistance offered by amorphous materials using present preparation techniques, the amorphous materials must be prepared and then joined to the surface to be protected, must be very carefully deposited onto the surface in the amorphous state, or must be otherwise specially prepared. Further, some surface areas of an article wear more rapidly than others, and the usual practice is to apply conventional protective coatings more thickly in such areas. However, controllable thicknesses of amorphous coatings cannot readily be applied, because of inherent limitations in achieving an amorphous as-deposited structure more than a few thousandths of an inch thick.

Thus, while amorphous materials offer great promise for use as wear-resistant coatings on parts, it is difficult to achieve their benefits because of the problems encountered in preparing the amorphous material and then attaching it to the surface, or preparing the amorphous material in place on the surface. As with all coatings applied as protective layers, if the thin amorphous coating is worn away in a location of particularly intense wear, the wearing environment may penetrate under the coating. A localized penetration of the coating can grow in lateral extent rapidly, so that adjacent portions of the coating are undermined and the coating flakes away. There is then a very rapid increase in the rate of damage, so that failure of a part thought to be protected can occur catastrophically, and between opportunities for inspection.

To achieve its benefits, great care must be taken to obtain the amorphous structure over a large surface area and particularly in areas which may be relatively inaccessible, as many coatings are much less wear-resistant after crystallization, as compared with their amorphous state. Yet, as the wear develops it may be discovered that only a relatively limited portion of the surface requires the greater wear resistance provided by the material in its amorphous state. In such circumstances, a great portion of the effort devoted to obtaining an acceptable amorphous structure over the entire surface is wasted, as only the limited portion is subjected to severe wear. On the other hand, the relatively limited portions where wear is greatest may be located in inaccessible places such as behind projections on the surface or at reentrant corners, so that application of the amorphous coating is most difficult in the area of the greatest need.

There is therefore a need for an improved process and material for protectin the surfaces of articles to obtain the benefits of the highly wear resistant amophous materials. Such a process should be economical, usable over both broad surface areas and in relatively inaccessible locations, and produce a structure which is resistant to catastrophic failures such as resulting from penetration of the areas subjected to the most intense wear. The present invention fulfills this need, and further provides related advantages.

SUMMARY OF THE INVENTION

The present invention resides in a process for protecting parts with a wear-resistant coating, wherein the coating is applied as a nonamorphous material and then continuously partially or fully transformed to an amorphous state during exposure in a wear-inducing environment. The coating may be applied quickly and conveniently by any of several conventional techniques such as laser cladding or plasma spraying, because the coating material is applied in a nonamorphous state and is initially present on the surface in the nonamorphous state. The outermost layer of the nonamorphous coating transforms to the amorphous state under the wearing action even as wearing proceeds, thereby offering increased resistance to the wear damage. As the outermost layer of the coating that is first transformed eventually wears away, the next portions exposed to the wear continuously transform to the amorphous state under the influence of the wear to replenish the resistant amorphous outermost layer. Thus, the coating of the invention is self-repairing in the sense that new wear-resistant amorphous material is continuously formed from the nonamorphous portion of the coating, to replace that worn away. Alternatively, the entire article or large portions thereof may be made of the transformable material.

In accordance with the invention, at least a portion of a surface of an article is covered with a frictionally transformable nonamorphous material, and then an outermost layer of the material is transformed to an amorphous state by subjecting the surface of the article to frictional or wear forces. As amorphous material is worn away from the outermost layer during exposure to the wear-inducing environment, the frictional wearing process continuously transforms additional underlying nonamorphous material to the amorphous state, thereby maintaining an outermost layer of amorphous material at the exposed surface of the coating and the protected article, which is preferably a part. The benefits of the invention can also be achieved by making the entire article or a large portion thereof from the frictionally transformable material, but in most instances use of a coating is preferred. When the entire article is of the frictionally transformable material, it may be said that the "coating" and the substrate upon which it is supported are of the same composition and are formed integrally.

The frictionally transformable nonamorphous material should be of a glass-forming composition. That is, it should be capable of forming amorphous materials when cooled from the molten state at very high rates. The preferred frictionally transformable material for use in the process of the present invention consists essentially of from about 40 to about 75 weight percent of a first component selected from the group consisting of iron, cobalt, and combinations thereof; more than about 20 weight percent of a second component selected from the group consisting of chromium, molybdenum, tungsten, niobium, and vanadium, and combinations of chromium, molybdenum, tungsten, niobium, vanadium, and titanium; and from about 2 to about 6 weight percent of a third component selected from the group consisting of boron, carbon, and combinations thereof. (All percentages herein are by weight, unless otherwise stated.) The use of cobalt in place of iron, or in combination with iron, increases the corrosion resistance and decreases the coefficient of friction of the coated article. The use of molybdenum, niobium, or tungsten in place of chromium, or in combination with chromium, enhances elevated temperature wear resistance of the coating. Most preferably, the frictionally transformable material consists essentially of about 59 weight percent iron, about 36 weight percent chromium, and about 5 weight percent boron. This composition is inexpensive and readily transformable to the amorphous state by the application of frictional or wear forces.

Preferably, the frictional forces are applied by unlubricated abrasive or adhesive wear of the coated surface, such as found in the drilling, grinding or scraping of hard rock materials, or by grinding the surface in preparation of the article, after the coating is applied. Other frictional or wear methods having sufficient severity to cause the transformation, are also acceptable. Although no generally acceptable scale of wear severity is known, operable frictional and wear methods may be readily determined using the approach described herein. A series of surfaces coated with the frictionally transformable material are subjected to wear by means of varying severity, and the extent of wear and coefficient of friction determined. A large reduction in wear and the coefficient of friction indicate surface transformation to the amorphous state. The transformation is verified by X-ray, hardness and microscopy studies, as described hereinbelow.

Coated articles and parts prepared by the process described above are also within the scope of the invention. Such articles have a substrate, the portion underlying and supporting the coating, formed in the shape of some useful structural tool such as a drill bit or scraper blade, and a coating of nonamorphous frictionally transformable material is applied to the surface of the part. The coating includes a nonamorphous portion adjacent the part, and an amorphous outermost layer adjacent the wear-inducing environment. The thickness of the initially nonamorphous coating may be as thin as a few microns or as thick as many thousandths of an inch. The thickness of the coating is not critical, as long as the coating adheres to the surface. The thickness of the transformed outermost amorphous layer adjacent the wear-inducing environment is very thin, and is believed to be at most only a few microns in thickness. However, because the thickness of this outermost layer is replenished with continuing wear, due to the continuing nature of the transformation, this thin layer provides adequate protection for the part. When the entire part or a large portion thereof is made of the frictionally transformable material, the same transformation and structure occurs as that just described.

It will be appreciated from the foregoing that the present invention represents an important and significant advance in the field of protecting parts from wear. The transformable material of the invention exposes an amorphous layer to the wear-inducing environment, which amorphous layer is both wear resistant and corrosion resistant. The coating is applied in the nonamorphous state by any of several conventional techniques, and then transformed by wear to produce the amorphous outermost layer adjacent the wear-inducing environment in the regions where the wear occurs. Because the transformation from the nonamorphous to the amorphous state at the outermost layer continues with continuing exposure to the wear-inducing environment, a protective wear-resistant amorphous layer is maintained even as successive portions of the coating are worn away. Thus, the coating cannot be undermined to cause catastrophic damage to the part, as long as some thickness of coating remains in an area. Other features and advantages of the present invention will become apparent from the following more detailed description, taken in conjunction with the accompanying drawings, which illustrate, by way of example, the principles of the invention.

BRIEF DESCRIPTION OF THE DRAWINGS

FIG. 3 is a superimposed tracing of two X-ray patterns of the surface of a coating prepared in accordance with the present invention, with pattern A a pattern obtained prior to frictional wear, corresponding to the structure of FIG. 1, and pattern B a pattern obtained after frictional wear, corresponding to the structure illustrated in FIG. 2;

DETAILED DESCRIPTION OF THE PREFERRED EMBODIMENT

Figure 1:
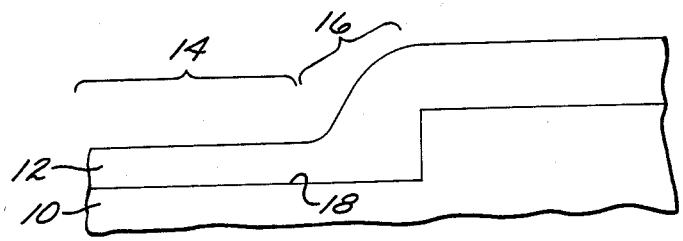
FIG. 1 is a fragmentary sectional view of an article coated with a frictionally transformable nonamorphous coating, prior to the application of frictional forces.
Figure 2:
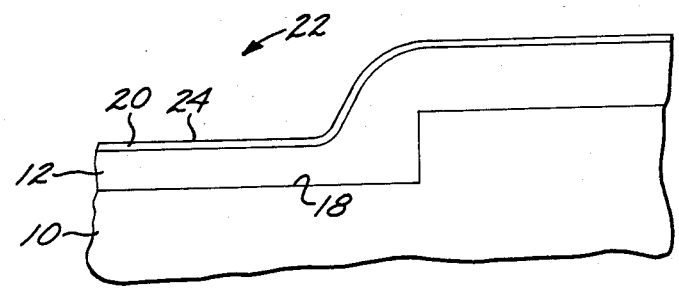
FIG. 2 is a fragmentary sectional view of the coated article in the same view as of FIG. 1, but after the application of frictional forces.

As is shown in the drawings for purposes of illustration, the preferred embodiment is concerned with a process for protecting an article such as a part, a portion of which is indicated by the numeral 10, by applying a coating 12 to the surface of the part 10. The part 10 is preferably first formed into essentially its final useful shape, prior to application of the coating. Examples of parts which may be usefully protected by the process of the present invention include drill bits, scraper blades, bearings, cutting tools, rubbing seals, chippers, pump liners, valve inserts and thread guides, but this listing is only exemplary and not exhaustive. Such parts are subjected to severe abrasive and adhesive wear during use, and it has long been recognized that such parts must be provided with protection from the effects of the wear-inducing environment. The part as fabricated becomes a substrate for receiving and supporting the wear-resistant coating 12.

In accordance with a preferred embodiment of the present invention, the part is protected with a layer of wear-resistant material by first coating at least a portion of the surface of the part with a frictionally transformable nonamorphous material, and then transforming at least a portion of a nonamorphous coating to the amorphous state by subjecting the coated surface of the part to frictional forces and wear.

Referring to FIG. 1, the part 10 is first coated with the coating 12 of a frictionally transformable nonamorphous material. The coating 12 is applied in the nonamorphous state, which allows any of a great variety of conventional processes to be utilized in applying the coating 12. For example, the coating may be applied by laser or electron beam cladding, casting in place, plasma spraying, flame spraying, electro-deposition, hot pressing, diffusion bonding, or arc coating.

Laser cladding is the presently preferred technique for placing the coating 12 on the part 10. The laser is used to melt metal of the desired coating composition to form a pool which is then allowed to solidify by moving the laser along the surface, thus removing the heat source. The laser is used as a high intensity localized surface heating means which may be readily directed and moved.

Plasma spraying is another technique for applying the coating 10, as plasma spraying is an economical, rapid technique for applying a nonamorphous coating across large areas of surface and also in relatively inaccessible places on a surface. In plasma spraying, the coating material is provided in the form of powder particles which are then vaporized in a plasma and ejected from a plasma gun against a surface under the force of gas pressure. Upon striking the surface, the metallic stream solidifies and forms the coating.

Depending upon any known wear pattern on the part, the parameters of the coating technique, and the skill of the operator, the coating may be made of uniform or varying thickness. The surface finish of the coating is not critical to the operability of the invention, and may be smooth or bumpy. Further, using laser cladding, plasma spraying or other techniques, the coating may be made relatively free of gross imperfections extending through the thickness of the coating. Even though plasma sprayed coatings are typically somewhat porous, such porous coatings are operable in conjunction with the present invention. The laser cladding technique produces a less porous coating than does the plasma spray technique, and this less porous coating is also operable in conjunction with the invention.

The coating can be intentionally applied more thickly in areas known from prior experience to receive the most intense wear. For example, the coating may be applied relatively uniformly across a broad surface indicated by the numeral 14 and illustrated in FIG. 1, and applied more thickly in an area such as that indicated by the numeral 16, known to be more susceptible to excessive wear during use. The process of the present invention improves the wear resistance of a coated part, but inevitably the coating is gradually worn away. It is a particular feature of the present invention that the areas known to be more susceptible to wear may be coated more thickly than the portions less susceptible to wear, so that the greatest total wear protection may be provided by an amorphous layer where it is most needed.

A surface 18 of the part 10 to which the coating 12 is applied should be sufficiently prepared prior to application of the coating 12 so that the coating 12 will properly adhere to the surface 18. In some instances, the coating 12 will be applied to the part 10 when the part 10 is made or immediately after the part 10 is manufactured, so that the surface 18 is relatively clean and need not be specially prepared. In other instances, the coating 12 may be applied to the part 10 which has been previously subjected to service, to avoid further effects of wear or to reestablish a coating which has been damaged or worn away. Before applying the coating 12 to the surface 18 of such a part 10, the surface 18 should be inspected and cleaned if necessary to remove physical impediments to the deposition of the coating 12, such as oxide, scale, or dirt. The amount of cleaning required will vary depending upon the technique used to apply the coating 12, and knowledge of the cleaning required is within the skill of those working in the art of coating. The surface 18 of the part 10 to be coated in accordance with the present invention need not be given special treatments beyond those ordinarily used with the selected coating technique.

After the coating 12 is applied to the surface 18 of the part 10, an outermost layer 20 exposed to a wear-inducing environment, indicated by the numeral 22, is transformed to the amorphous state by exposure to frictional forces or wear. The transformation may be accomplished either by exposing the outermost layer 20 to a specially selected friction and wear environment, or, alternatively, to a working environment, in which the part is expected to operate, of sufficient wear severity to cause the transformation.

Preferably, the transformation of the outermost layer 20 is accomplished by its exposure to moderate to severe unlubricated abrasive wear. Such unlubricated abrasive wear may be induced by a great many working environments and standardized procedures. The presently most preferred approach is a wear environment as set forth in the ASTM G-65 Standard Practice, which generally corresponds to the environment found in the drilling of holes in oil fields or coal beds. The ASTM G-65 Standard Practice is described in detail in Standard Practice G65-81, issued by the American Society for Testing and Materials, Philadelphia, Penn. which Standard Practice is herein incorporated by reference. This Standard Practice involves the abrading of a standard test specimen of dimensions one inch by three inches on the wearing face, with a grit of rounded quartz sand and having a size distribution as follows:

| U.S. Sieve Size | Sieve Opening (microns) | Percent Retained on Sieve |
| --- | --- | --- |
| 40 | 425 | None |
| 50 | 300 | 5 maximum |
| 70 | 212 | 95 maximum |
| 100 | 150 | None passing |

The grit is introduced between the test specimen and a rotating wheel having a chlorobutyl rubber tire or rim of hardness Durometer A-60. The diameter of the rim is 9 inches, and the wheel is turned at 200 revolutions per minute. The grit is introduced between the rim and the specimen by a nozzle at a sand flow rate of 250 to 350 grams per minute. The test specimen is pressed against the rotating rim with a force of 30 pounds and the test duration is 2000 revolutions, in the presently preferred B variation of the G-65 Standard Practice. The rotation of the wheel is such that the face contacting the test specimen moves in the direction of the sand flow. Test specimens are weighed before and after the test, and the difference divided by the density of the test specimen to obtain a volume loss in cubic millimeters, when the Standard Practice is used to compare the wear resistance of various materials. Thus, the G-65 Standard Practice sets forth the presently most preferred means of providing the wear-inducing environment for frictionally transforming the nonamorphous coating, and also a convenient method of comparing resistance to frictional wear between materials. Other approaches to providing the wear-inducing environment are also sufficiently severe to transform the coating, including, for example, working environments producing moderate-to-severe abrasive wear and artificial hardening approaches such as surface grinding.

Exposure of the coating 12 to the wear-inducing environment transforms the outermost layer 20 of the coating 12 to the amorphous state. The thickness of the transformed outermost layer 20 is small, and is believed to be on the order of a few microns. The presence of the amorphous outermost layer 20 is most directly confirmed by the use of X-rays. Briefly, X-ray diffractometer scans of nonamorphous materials show a multitude of diffraction peaks at angles predicted by the Bragg relation. Because amorphous materials have no long range or short range order, the peaks are largely suppressed and replaced by a smooth curve.

To establish the amorphous character of the outermost layer 20, a coated part was prepared by plasma spraying a steel plate with a blended mixture of elemental powders, the composition of the mixture being 59.4 weight percent cobalt powder, 35.6 weight percent niobium powder, and 5 weight percent boron powder. The coating thickness was measured metallographically as about 0.020 inches. The curve labeled A in FIG. 3 is a tracing of a diffractometer scan of the coating, using filtered copper K-alpha X-ray radiation. The peaks observed are representative of typical nonamorphous materials, and the angular locations are determined by the spacings and orientations of the atomic planes in the coating. The line C has been sketched onto pattern A along the locus of the low points between the peaks. The line C is seen to be almost flat, corresponding to a typical nonamorphous material.

The part was next placed in a wear testing apparatus meeting the requirements of the ASTM G-65 test procedure described above, with the coating exposed to the wear, and worn by unlubricated abrasive wear for a total of 2000 revolutions. The sample was removed and the X-ray pattern labeled B in FIG. 3 taken. The line D has been sketched onto Pattern B along the locus of low points between the peaks. Line D has a convex upward form near the left end of the pattern, indicative of the presence of amorphous material. As expected, peaks of generally broader intensity above line D are also seen in Pattern B, showing that nonamorphous material remains in the coating 12, in addition to the transformed amorphous material of the outermost layer 20. It is believed that the presence of the peaks in Pattern B results from the penetration of the X-ray beam through the outermost layer 20 and into the coating 12. It is known that the X-ray radiation used penetrates a total of about 10 microns into the outermost layer 20 and the coating 12, and it is therefore believed that the thickness of the outermost layer 20 of this sample is considerably less than this depth, and probably about 2-3 microns. Further evidence for the transformation of the outermost layer 20 from nonamorphous to amorphous material is provided in the hardness testing using variable loads as set forth in Example II below and the electron microscopy described in Example X below.

The transformation that occurs in the outermost layer 20 under the influence of the frictional and wear loading is to be distinguished from simple work hardening of surface layers by impinging particles. Surface layers of some conventional coatings may be hardened by striking the surface with particles, as in industrial shot peening. In such processes, the surface is deformed so that the surface layers are work hardened to higher strength and hardness levels than the as-deposited material. However, such conventional surface hardening procedures do not result in the change in the X-ray patterns exhibited in FIG. 3, nor is the hardness change as extreme as reported in Example II. Work hardening techniques also typically reduce the corrosion resistance of the surface. By contrast, the present invention results in an improvement in corrosion resistance in the transformed outermost layer 20.

The outermost layer 20 of the coating of the present invention, after the frictional transformation occurs, is also to be distinguished from coatings wherein hard particles in a matrix are present at the surface exposed to the wear-inducing environment. The outermost layer 20 is generally chemically homogeneous, largely free of defects, and uniform in microstructure. (Minor variations such as inclusions or untransformed material are also sometimes present.) This homogeneity, freedom from defects, and uniformity are important advantages. Conventional inhomogeneous structures such as hard particles (e.g. chromium carbide) in a crystalline matrix are more susceptible to corrosion damage along boundaries and due to chemical potential differences than are coatings of the present invention. They are also susceptible to very uneven wear, as when hard particles are undermined and lost from the surface. The surface structure of the present invention avoids such problems, which accelerate coating failure.

The transformed amorphous outermost layer 20 provides improved wear resistance to the coated part, but with continuing wear the material at an exposed surface 24 is worn away. An important advantage of the process of the present invention is that, as some material is worn away, additional nonamorphous material in the coating 12 is transformed to the amorphous state, so as to replenish the amorphous material in the outermost layer 20 to maintain the thickness of the outermost layer 20 approximately constant. It is therefore not necessary to periodically remove the part from the wear-inducing environment to reharden the material at the exposed surface 24, as the outermost layer 20 is continuously replenished by further transformation in the coating 12. Nevertheless, a part may optionally be removed from the wear-inducing environment to artificially reharden the surface by application of sufficiently severe frictional and wear forces, if desired.

Figure 4:
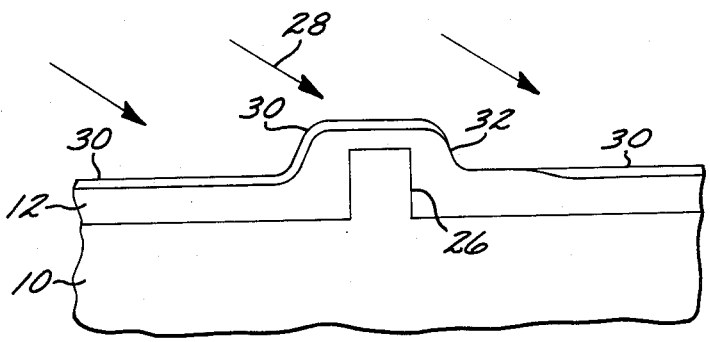
FIG. 4 is a fragmentary sectional view of a coated article having a protrusion, illustrating the effect of a nonuniform wear pattern.

Because the effect of the wear-inducing working environment itself can transform nonamorphous to amorphous material in the outermost layer 20, only those areas of the coating 12 experiencing sufficiently severe wear exhibit a transformed amorphous outermost layer (unless the surface has been previously transformed by exposure to an artificial wear-inducing environment). FIG. 4 illustrates a coated part whose exposed surface has not been prehardened by exposure to an artificial wear-inducing environment, but instead the coated part is first exposed to the wear-inducing working environment. The part 10 includes a projection 26 which is itself coated. In the illustration of FIG. 4, the wear-inducing environment is taken to be a stream of abrasive particles moving in the direction indicated by the arrows 28. For the purposes of illustration, the wear is assumed to be greatest on the portions directly contacted by the particles in the stream, while the wear is least or nonexistent in those areas not exposed to the direct stream of particles because they are hidden behind the projection 26. The areas directly exposed to the stream of wear-inducing particles exhibit a transformed outermost layer 20 over the areas indicated at the numerals 30, while those areas not directly exposed to the particles and therefore not experiencing significant wear do not exhibit a transformed outermost layer 20, as illustrated at the numeral 32.

Figure 5:
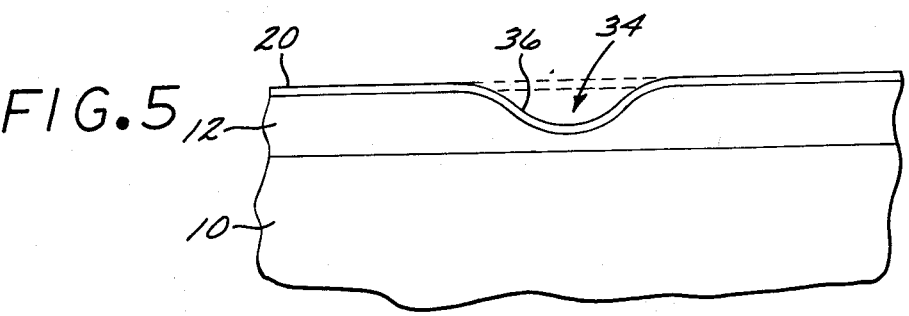
FIG. 5 is a fragmentary sectional view of a coated article wherein a portion of the coating has been locally removed, as by gouging, with the result that a new outermost layer is formed.

Another important aspect of the present invention is illustrated in FIG. 5, wherein the part 10 is protected by the coating 12, with a transformed outermost layer 20. It sometimes happens that extremely severe wear damage occurs locally, as where an unusually large chunk of rock gouges away a significant portion of the thickness of the coating 12, to leave a gouge mark 34. With many conventional coatings having a hardened surface layer, the gouge mark 34 may serve as an initiation site for rapid, catastrophic wear of the coating, because within the gouge mark unhardened material is exposed to the wear-inducing environment. The wear can then undermine the hardened upper layer, leading to rapid flaking away of the upper layer, degradation of the coating, and failure of the part. By contrast, with a coating made of a frictionally transformable material of the present invention, after formation of the gouge mark 34, the bottom of the gouge mark 34 immediately is transformed to the amorphous state under the action of the frictional and wearing forces, thereby reestablishing a wear resistant outermost layer, as at the numeral 36, along the sides of the gouge mark 34. In this sense, the coating is self-repairing and highly tolerant of conditions wherein severe damage may occur.

The process of the present invention is particularly well suited for the protection of parts that are relatively inaccessable during their use, and therefore cannot be inspected readily. For example, rock drill bits used in oil well exploration are operated to drill rock in a down-hole wear-inducing environment. The drill hole may be as deep as five miles, and the changing of a rock drill bit requires that the drill pipe string be extracted from the hole section-by-section to change the drill bit when necessary. The procedure of bringing the drill bit to the surface, replacing the drill bit, and then returning the drill bit to the down-hole position may require as many as 30 hours of down time for the oil drilling rig, which results in extremely high costs. When a drill bit is coated with a frictionally transformable material in accordance with the present invention, the hardened outermost layer is continually replenished with newly hardened material, thereby extending the useful life of the drill bit, and reducing down time and deterioration of the cutting ability of the bit. The coating in accordance with the present invention is quickly and easily applied to the drill bit by plasma spraying, arc coating or laser cladding.

The following examples illustrate aspects of the present invention, but are not to be taken as limiting the invention in any respect.

EXAMPLE I

Alloy coatings of the following compositions were prepared by plasma spraying the broad faces of steel test samples of dimensions 1×3×⅜ inches, using elemental powders provided in the weight percentages shown in the following table. The coatings were in each case about 0.020 inches thick. The coatings were worn by the ASTM G65-81 Standard Practice, for 2000 revolutions. The amount of wear was determined by measuring the volume of material worn away, as provided in the Standard Practice, and is expressed in the following table in cubic millimeters.

| SAMPLE | COMPOSITION IN WEIGHT PERCENT | VOLUME LOSS (mm$^3$) |
|---|---|---|
| 1 | 49 tungsten, 8 chromium, 3 boron, balance iron | 28.5 |
| 2 | 9 chromium, 11 vanadium, 5 titanium, 4 carbon, balance iron | 31.6 |
| 3 | 37 chromium, 5 boron, balance iron | 32.9 |
| 4 | 36 niobium, 5 boron, balance cobalt | 29.1 |
| 5 | 37 chromium, 5 carbon, balance iron | 46.0 |
| 6 | 35 titanium, 5 boron, balance iron | 81.9 |

| SAMPLE | COMPOSITION IN WEIGHT PERCENT | VOLUME LOSS (mm³) |
|---|---|---|
| 7 | 27 iron + cobalt, 26 chromium, 43 molybdenum, 4 carbon + boron | 90.4 |
| 8 | 17 iron, 58 titanium, 15 chromium, 10 boron | more than 90.0 |

For comparison purposes, the volume loss for AISI 4815 steel carburized to a minimum Rockwell C hardness of 57 was measured to be 34.2 cubic millimeters. The volume loss for plasma sprayed Metco 73F tungsten carbide-cobalt composite coating of composition 83 weight percent tungsten carbide, 17 weight percent cobalt was measured to be 42.8 cubic millimeters in the same test.

Samples 1–5, which are within the scope of the present invention, have lower volume loss and consequently greater wear resistance, than Samples 6–8 which are not within the scope of the present invention.

EXAMPLE II

The surface hardnesses of several materials were evaluated with a Vickers hardness test performed with a Leco M-400 hardness tester, using different indenter loads, as illustrated in the following table. Samples 1 and 2 are the same samples as discussed in Example I, and the steel test block is a standard block having a specified Knoop hardness of 741.

| Indenter Load, Grams | Vickers Hardness No. | | |
|---|---|---|---|
| | Sample 1 | Sample 2 | Test Block |
| 100 | 660 | 730 | 751 |
| 25 | 1160 | — | 737 |
| 10 | 1540 | 1355 | 780 |

For samples 1 and 2, the surface hardness increases significantly with decreasing indenter load, but the surface hardness increases only marginally for the steel test block with changing load. The effect of a decreased indenter load is that the region sampled becomes smaller and nearer to the surface with decreasing load. That is, it is believed that the 10 gram load samples the hardness of only the outermost surface layer of the coating, while the 100 gram load samples not only the transformed outermost layer, but also a relatively large volume of the untransformed coating. The 10 gram load is therefore sampling a volume of nearly that of the transformed outermost surface layer, while the 25 and 100 gram loads penetrate deeper to sample the outermost layer and increasing amounts of the untransformed coating. These results, together with the X-ray studies reported above and the microscopy of Example X, establish the presence of the amorphous transformation in the outermost layer of the coating.

EXAMPLE III

The inside bore of a cylindrical steel nozzle was laser coated with an alloy of 46 weight percent iron, 21 weight percent cobalt, 14.4 weight percent niobium, 10.9 weight percent chromium, 5.5 weight percent nickel, and 2.2 weight percent boron, so that the as-coated inside diameter was 1.0 millimeter (mm). The hardness of the coating was measured as 900 VHN, before any exposure to wear. This nozzle was used to convey a fine slurry of alumina-silica sand under high pressure and flow rates. The original 1.0 mm diameter orifice was enlarged to 1.03 mm diameter after 122 hours. Tungsten carbide-cobalt nozzles enlarged to an average diameter of 1.07 mm after 122 hours of similar wear. This result is surprising, and further illustrates the nature of the amorphous transformation of the coating, as the hardness of the tungsten carbide-cobalt nozzle before any wear is much greater, on the order of about 1800 VHN.

Examples IV–V utilize both the dry abrasive wear ASTM-G-65 test described previously and also a wet slurry test procedure set forth below, and examples VI and VII use only the wet slurry test. In the wet slurry test procedure, a three inch diameter flexane-60 urethane rubber disk rotates horizontally in a container holding a slurry. A paddle wheel continually stirs the slurry. A specimen of about ⅜ inch diameter or less of known weight is pressed against the urethane rubber disk by a linkage loaded with a three pound dead weight. The disk is rotated over the specimen, typically about 70 revolutions per minute by a motor for a period of time of 30 minutes. The specimen is then weighed and the weight loss during the test calculated. Weights are carefully measured in all cases using a balance accurate to 0.00001 gram. A relative wear resistance WR is then calculated as:

$$WR = \frac{Ws}{Wr} \times \frac{Dr}{Ds}$$

Ws is the weight loss for standard 302 stainless steel sample tested under the same conditions; Wr is the weight loss for the material under evaluation; Ds is the density of 302 stainless steel; and the Dr is the density of the material under evaluation.

The slurry is prepared as a mixture of 200 parts of 200 mesh quartz sand with 94 parts water, the mixture being stabilized by an addition of 0.025 parts xanthan gum. The slurry and the rubber disk are changed at the end of each day of testing and no more than four thirty-minute tests are accomplished in each day. A 302 stainless steel standard is measured at the beginning or end of each day of testing, and the results of this test provide a basis for ensuring reproductability of results from day to day.

EXAMPLE IV

A layer of material was applied to the surface of a steel substrate by laser cladding an alloy having a composition of 59 weight percent iron, 36 weight percent chromium, and 5 weight percent boron. One such sample was wear tested using the ASTM-G-65 procedure B described above, and the volume loss was determined to be 21.6 cubic millimeters. The wear resistance WR measured on the wet slurry tester was determined to be 16.7 times that of the full hard 302 stainless steel standard. These results illustrate that this preferred composition readily transforms under both unlubricated abrasive wear in the ASTM-G-65 procedure and also under the slurry wear procedure, when the coating is fully dense and has good cohesive strength.

EXAMPLE V

An alloy consisting essentially of 59 weight percent iron, 36 weight percent chromium, and 5 weight percent boron was fused onto a mild steel backing by electron beam melting and tested in the wet slurry abrasive slurry test described previously. The wear resistance WR of the coating relative to full hard 302 stainless steel was 25.5. Another sample of the same coated material had a volume loss of 21.6 cubic millimeters in the ASTM-G-65 test described previously.

EXAMPLE VI

An alloy consisting essentially of 75 weight percent iron, 22 weight percent chromim, and 3 weight percent boron was fused by electron beam melting to a mild steel backing. The sample had a wear resistance WR of 7 times that of full hard 302 stainless steel when tested in the wet slurry test described previously. The iron and chromium contents of this sample are at or near the upper and lower limits, respectively, of operability.

EXAMPLE VII

A coating consisting essentially of 58.8 weight percent iron, 36.5 weight percent chromium, and 4.7 weight percent boron was plasma sprayed onto a mild steel backing. Three such samples were tested in the wet slurry wear tester described previously and the wear resistance WR was found to be 2.2, 2.6, and 3.8 times that of full hard 302 stainless steel, respectively. Another coated sample was ground without lubrication in a surface grinder to remove about 0.005 inches of material, leaving a coating about 0.015 inches thick on the mild steel plate. The wear resistance WR of this ground sample was found to be 17 times that of the full hard 302 stainless steel.

EXAMPLE VIII

A mixture of elemental powders having a composition of 41.2 iron, 20.9 chromium, 25.3 molybdenum, 9.8 cobalt, and 2.8 boron plus carbon was laser clad onto a piece of mild steel. The coating was tested using the ASTM G-65 Standard Procedure described previously. The volume loss after 2000 revolutions was 12.1 cubic millimeters.

EXAMPLE IX

Annular shaped members were prepared for a thrust bearing test to determine the frictional characteristics of the coated samples. the rubbing faces of the disks were approximately 1 and ⅝ inches outside diameter with an open center about ⅞ inches diameter. One disk was a tool steel coated with a tungsten-cobalt-boron amorphous layer about 0.0015 inches thick. The other disk was a high strength, low alloy steel, laser coated with an alloy in accordance with the invention comprising 47 weight percent iron, 23.7 weight percent cobalt, 26.8 weight percent niobium, and 2.5 weight percent boron. The tungsten-cobalt-boron disk was held stationary and the other disk was rotated in facing relation with the first disk at 100 revolutions per minute. The two disks were pressed together under an applied load of 8000 pounds, with greased lubrication.

As a standard for comparision, identically dimensioned samples of a tool steel and a carburized high-strength, low-alloy steel were run against each other under exactly the same conditions.

After two hours running time, the torque and temperature rise for the two tests were measured as follows:

| Material | Torque in Inch-Pounds | Temperature Rise in Degrees (F.) |
| --- | --- | --- |
| Amorphous Materials | 140 | 90 |
| Standards | 280 | 225 |

As indicated by these results, the amorphous materials run against each other in this thrust bearing test result in a lower required torque to rotate the elements of the bearing and also result in a smaller temperature rise during operation. These advantages suggest a lower coefficient of friction in the amorphous materials as compared with the standards. Decreased torque requirements and reduced temperature increases are important design advantages for use of such materials in bearings.

EXAMPLE X

Figure 6:
FIG. 6 is a scanning electron micrograph of a heavily etched, laser clad coating on a surface, before the surface is subjected to wear, with triangular etch pits characteristic of a non-amorphous material.

A piece of steel was laser-clad to a thickness of about 0.020 inches with an alloy comprising 47 weight percent iron, 23.7 weight percent cobalt, 26.8 weight percent niobium, and 2.5 weight percent boron. The as-coated sample, before exposure to frictional wear, was sectioned, polished, and heavily etched. FIG. 6 is a scanning electron micrograph of the coating, which exhibits triangular etch pits throughout. Such triangular etch pits are characteristic of the crystallographic arrays of atoms in a non-amorphous material, indicating that the coating is entirely non-amorphous.

Figure 7:
FIG. 7 is a scanning electron micrograph of the same sample as FIG. 6, but after the surface is subjected to wear, with circular etch pits characteristic of an amorphous material.
Figure 8:
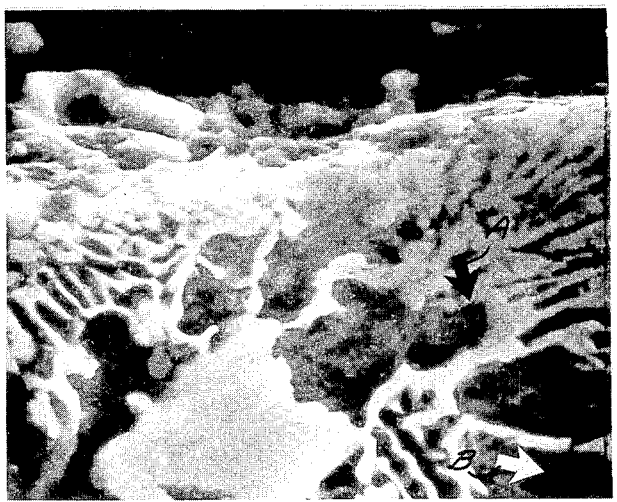
FIG. 8 is a scanning electron micrograph of another area on the same sample as FIG. 7, showing circular etch pits near the surface and triangular etch pits further from the surface.

The coated surface of the sample was then contacted to a grinding wheel, to subject the surface to unlubricated severe abrasive wear. About 0.005 inches of the coating was removed. The side surface was repolished and again heavily etched. FIG. 7 is a scanning electron micrograph of the coating, illustrating the circular etch pits observed in some portions of the coating. The circular etch pits are characteristic of an amorphous material, indicating its presence in the worn coating. FIG. 8 is a lower magnification scanning electron micrograph of the same coating shown in FIG. 7, illustrating the presence of circular etch pits (arrow A) nearer the worn surface and triangular etch pits (arrow B) more remote from the surface. In this material, the depth of the amorphous layer appears to be about 8 microns, as evidenced by circular etch pits at this depth. The laser-clad coating is therefore non-amorphous as applied, but transforms to the amorphous state to a depth of about 8 microns when severely worn.

It is preferably that the entire volume of the outermost layer of the applied nonamorphous coating be transformed to the amorphous state. In some instances, however, only a portion of the outermost layer transforms to the amorphous state, as, for example, 75 percent of the volume of the outermost layer. Such a partial transformation is within the scope of the present invention, as long as at least a portion of the outermost layer is transformed to the amorphous state under the action of the wearing environment.

Frictionally transformable materials in accordance with the present invention may be utilized in a wide variety of machinery and other applications. Some examples of such applications are found in the following United States Patents, whose disclosures are herein incorporated by reference: U.S. Pat. Nos. 2,761,711; 3,008,429; 3,207,181; 3,243,067; 3,334,428; 3,462,861; 3,806,569; 3,915,459; 3,971,412; 4,207,658; 4,248,485; 4,262,761; 4,285,638; and 4,293,287. It is emphasized that the applications discussed in these patents are illustrative, rather than exhaustive, and that the applications are not limited to the embodiments illustrated in the patents. Instead, the patents are presented to show the types of applications.

Frictionally transformable materials are advantageously utilized in seals and other members which experience rubbing and friction from rotating or reciprocating members. Examples include the wearing faces of the pair of annular sealing members 16 and 17 which contact a rotating shaft 10 in U.S. Pat. No. 2,761,711. Similarly, contacting elements such as the face 20 and the annular flanges 38 of the seal 12 illustrated in U.S. Pat. No. 3,915,459, which illustrates a different type of shaft seal, may be coated with or made of a frictionally transformable material. In these examples, the frictionally transformable material is used in conjunction with rotating shafts. The frictionally transformable material may also be advantageously used in relation to reciprocating pistons, as for example at the wearing surface of the cylinder liner 11 or the piston 21, as illustrated in U.S. Pat. No. 3,008,429.

Frictionally transformable materials may also be used in various valve applications, both in relation to operating elements and to resist wear of the material flowing through the valve. Examples of the use of frictionally transformable amorphous materials include their use on the faces of the disks 19 illustrated in U.S. Pat No. 3,207,181; and various elements of the valve illustrated in U.S. Pat. No. 3,971,412, including faces of the insert 7, the valve head 9, inserts 92 and 94, and slide disks 98 and 99. The frictionally transformable amorphous materials may also be used to resist the wearing action of the material flowing through the valve, as for example, their use on the wearing surfaces of the nozzle shell 52 and the nozzle tip 54 disclosed in U.S. Pat. No. 4,285,638.

Frictionally transformable materials are also used on the contacting surfaces of bearings, as illustrated previously in relation to Example IX. Another example is provided by the wearing surfaces of the various bushings 33, 34, and 35 disclosed in U.S. Pat. No. 4,207,658. Similarly, the amorphous materials may be used on the bearing surfaces 23, 24, 34, 38, 32, 35, and 35A, at the thrust flange surfaces 56 and 57, and at the inlay 58 of the bit disclosed in U.S. Pat. No. 4,248,485. The other surfaces of the bit which are exposed to wear and frictional loadings may also be protected with a frictionally transformable material.

It is anticipated that one of the highest volume uses for frictionally transformable materials is in elements which cut, scrape, or grind during use, and are thereby intentionally subjected to high wear loadings. Examples of such potential uses include the cutting blade 42 in U.S. Pat. No. 3,243,067; the leading edge cutting means 20 in U.S. Pat. No. 3,334,428; the leading edges of the bucket blade 14 and the point 16 disclosed in U.S. Pat. No. 3,462,861; the leading edges of the tooth assemblies 13 and the lip portions 15 of the earth working implement disclosed in U.S. Pat. No. 3,896,569; the surfaces of the teeth 32 of the rotary rock bit disclosed in U.S. Pat. No. 4,262,761; and the exposed surfaces of the cutter shell 19 which support the cutting structures 15 of the rotary boring bit disclosed in U.S. Pat. No. 4,207,658.

It will now be appreciated that, through the use of the process of this invention, there is applied to the surface of a part a wear-resistant coating whose outermost layer is transformed during wear to a hard, wear-resistant amorphous state. The application of the coating in a nonamorphous state and the subsequent transformation of the outermost layer to the amorphous state offer significant advantages in reduced application and materials costs, as well as improved efficiency, reliability and durability of the coated part. Solid articles made in whole or in part of the transformable material can also be prepared, and the surfaces of such articles undergo the same transformation in a wear-inducing environment. Although a particular embodiment of the invention has been described in detail for purposes of illustration, various modifications may be made without departing from the spirit and scope of the invention. Accordingly, the invention is not to be limited except as by the appended claims.

What is claimed is:

1. A process for producing a wear-resistant article, comprising the steps of:

providing a frictionally transformable nonamorphous material over at least a portion of the surface of the article, wherein the nonamorphous material consists essentially of: a first component selected from the group consisting of iron and combinations of iron and cobalt, said first component being present in an amount of from about 40 to about 75 weight percent, a second component selected from the group consisting of tungsten, molybdenum, chromium, niobium, vanadium and combinations of tungsten, molybdenum, chromium, niobium, vanadium, and titanium, said second component being present in an amount of greater than about 20 weight percent, and a third component selected from the group consisting of boron, carbon, and combinations thereof, said third component being present in an amount of from about 2 to about 6 weight percent; and transforming at least a portion of the outermost layer of the frictionally transformable nonamorphous material to the amorphous state by subjecting the material to frictional forces of sufficiently great severity.

2. The process of claim 1, wherein said step of providing is performed by coating a substrate with the frictionally transformable material.

3. The process of claim 1, wherein said step of providing is accomplished by forming the article of the frictionally transformable material.

4. The process of claim 1, wherein said step of providing is accomplished by laser cladding the surface of the article.

5. The process of claim 1, wherein said step of transforming is accomplished by unlubricated abrasive wear of the coated surface.

6. The process of claim 1, including the following additional step, after said step of transforming:

wearing away a portion of the amorphous material, and simultaneously transforming additional nonamorphous material to the amorphous state, thereby replenishing the amount of amorphous material, by subjecting the surface of the article to frictional forces.

7. A process for producing a wear-resistant article, comprising the steps of:

providing a frictionally transformable nonamorphous material over at least a portion of the surface of the article, wherein the nonamorphous material consists essentially of about 59 weight percent iron, about 36 weight percent chromium, and about 5 weight percent boron; and transforming at least a portion of the outermost layer of the frictionally transformable nonamorphous material to the amorphous state by subjecting the material to frictional forces of sufficiently great severity.

8. A part prepared by the process of claim 1.

9. A drill bit component prepared by the process of claim 1.

10. A seal component prepared by the process of claim 1.

11. A valve component prepared by the process of claim 1.

12. A cutter component prepared by the process of claim 1.

13. A process for protecting a part with a wear-resistant material, comprising the step of:

furnishing the part with a frictionally transformable nonamorphous material at the surface of the part, wherein the nonamorphous material consists essentially of a first component selected from the group consisting of iron, cobalt, and combinations thereof, said first component being present in an amount of from about 40 to about 75 weight percent, a second component selected from the group consisting of tungsten, molybdenum, chromium, niobium, vanadium, and combinations of tungsten, molybdenum, chromium, niobium, vanadium, and titanium, said second component being present in an amount of greater than about 20 weight percent, and a third component selected from the group consisting of boron, carbon, and combinations thereof, said third component being present in an amount of from about 2 to about 6 weight percent.

* * * * *